(12) United States Patent
Wilford

(10) Patent No.: US 6,512,766 B2
(45) Date of Patent: *Jan. 28, 2003

(54) ENHANCED INTERNET PACKET ROUTING LOOKUP

(75) Inventor: Bruce A. Wilford, Los Altos, CA (US)

(73) Assignee: Cisco Systems, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/918,506

(22) Filed: Aug. 22, 1997

(65) Prior Publication Data

US 2001/0012295 A1 Aug. 9, 2001

(51) Int. Cl.[7] ................................................ H04L 12/28
(52) U.S. Cl. .................... 370/389; 370/395.32; 711/216
(58) Field of Search ................................. 370/389, 392, 370/352, 395, 396, 397, 899, 404, 469, 475, 400–402, 395.1, 399, 395.3, 395.32, 395.52–395.54, 409; 707/382, 252, 104, 1, 6; 711/216–217, 321, 211; 709/217–219

(56) References Cited

U.S. PATENT DOCUMENTS

| | | |
|---|---|---|
| 3,389,377 A | 6/1968 | Cole |
| 3,402,398 A | 9/1968 | Koerner et al. |
| 3,483,528 A | 12/1969 | Koerner et al. |
| 3,518,631 A | 6/1970 | Lindquist et al. |
| 3,602,899 A | 8/1971 | Lindquist et al. |
| 3,868,642 A | 2/1975 | Sachs |
| 4,131,767 A | 12/1978 | Weinstein ................ 179/170.2 |
| 4,161,719 A | 7/1979 | Parikh et al. ......... 340/147 SY |
| 4,316,284 A | 2/1982 | Howson ..................... 370/105 |
| 4,397,020 A | 8/1983 | Howson ..................... 370/105 |
| 4,419,728 A | 12/1983 | Larson ....................... 364/200 |
| 4,424,565 A | 1/1984 | Larson ....................... 364/200 |
| 4,437,087 A | 3/1984 | Petr .................... 340/347 DD |
| 4,438,511 A | 3/1984 | Baran .......................... 370/19 |
| 4,439,763 A | 3/1984 | Limb ...................... 340/825.5 |
| 4,445,213 A | 4/1984 | Baugh et al. ................. 370/94 |
| 4,446,555 A | 5/1984 | Devault et al. ............... 370/94 |
| 4,456,957 A | 6/1984 | Schieltz ..................... 364/200 |
| 4,464,658 A | 8/1984 | Thelen ................... 340/825.5 |
| 4,499,576 A | 2/1985 | Fraser ......................... 370/60 |
| 4,506,358 A | 3/1985 | Montgomery ............... 370/60 |

(List continued on next page.)

FOREIGN PATENT DOCUMENTS

| | | | |
|---|---|---|---|
| EP | 0 384 758 A2 | 2/1990 | .......... H04L/12/56 |
| EP | 0 384 758 A2 | 8/1990 | |

(List continued on next page.)

OTHER PUBLICATIONS

Allen, M., "Novell IPX Over Various Wan Media (IPXWAN)," Network Working Group, RFC 1551, Dec. 1993, pp. 1–22.

(List continued on next page.)

Primary Examiner—Steven Nguyen
(74) Attorney, Agent, or Firm—Swernofsky Law Group PC

(57) ABSTRACT

The invention provides a method and system for routing information lookup for packets using routing protocols such as IP or IP multicast (IGMP), or MPLS (multiprotocol label switching, also known as tag switching or label switching) or MPLS multicast, in which both the destination address and the length of that destination address are matched using a lookup table having separate entries for selected addresses and their lengths, which can be accessed in parallel for multiple representations of destination addresses, and in which the input interface associated with the packet is included in the information used for matching.

12 Claims, 2 Drawing Sheets

U.S. PATENT DOCUMENTS

| | | | | |
|---|---|---|---|---|
| 4,507,760 A | 3/1985 | Fraser ........................ 365/221 |
| 4,532,626 A | 7/1985 | Flores et al. .................. 370/85 |
| 4,644,532 A | 2/1987 | George et al. ................ 370/94 |
| 4,646,287 A | 2/1987 | Larson et al. ................. 370/60 |
| 4,677,423 A | 6/1987 | Benvenuto et al. .. 340/347 DD |
| 4,679,189 A | 7/1987 | Olson et al. |
| 4,679,227 A | 7/1987 | Hughes-Hartogs ........... 379/98 |
| 4,723,267 A | 2/1988 | Jones et al. ................... 379/93 |
| 4,731,816 A | 3/1988 | Hughes-Hartogs ........... 379/98 |
| 4,750,136 A | 6/1988 | Arpin et al. ................. 364/514 |
| 4,757,495 A | 7/1988 | Decker et al. ................ 370/76 |
| 4,763,191 A | 8/1988 | Gordon et al. ................ 358/86 |
| 4,769,810 A | 9/1988 | Eckberg, Jr. et al. ......... 370/60 |
| 4,769,811 A | 9/1988 | Eckberg, Jr. et al. ......... 370/60 |
| 4,771,425 A | 9/1988 | Baran et al. .................. 370/85 |
| 4,819,228 A | 4/1989 | Baran et al. .................. 370/85 |
| 4,827,411 A | 5/1989 | Arrowood et al. |
| 4,833,706 A | 5/1989 | Hughes-Hartogs ........... 379/98 |
| 4,835,737 A | 5/1989 | Herrig et al. ................ 364/900 |
| 4,879,551 A | 11/1989 | Georgiou et al. ...... 340/825.87 |
| 4,893,306 A | 1/1990 | Chao et al. ................ 340/94.2 |
| 4,903,261 A | 2/1990 | Baran et al. ................ 370/94.2 |
| 4,922,486 A | 5/1990 | Lidinsky et al. .............. 370/60 |
| 4,933,937 A | 6/1990 | Konishi .................. 370/85.13 |
| 4,960,310 A | 10/1990 | Cushing ...................... 350/1.7 |
| 4,962,497 A | 10/1990 | Ferenc et al. .............. 370/60.1 |
| 4,962,532 A | 10/1990 | Kasiraj et al. ................. 380/25 |
| 4,965,767 A * | 10/1990 | Kinoshita et al. ............. 365/49 |
| 4,965,772 A | 10/1990 | Daniel et al. |
| 4,970,678 A | 11/1990 | Sladowski et al. .......... 364/900 |
| 4,979,118 A | 12/1990 | Kheradpir ................... 364/436 |
| 4,980,897 A | 12/1990 | Decker et al. ................. 375/38 |
| 4,991,169 A | 2/1991 | Davis et al. ................... 370/77 |
| 5,003,595 A | 3/1991 | Collins et al. ................. 380/25 |
| 5,014,265 A | 5/1991 | Hahne et al. .................. 370/60 |
| 5,014,327 A | 5/1991 | Potter et al. |
| 5,020,058 A | 5/1991 | Holden et al. ............... 370/109 |
| 5,033,076 A | 7/1991 | Jones et al. ................... 379/67 |
| 5,034,919 A * | 7/1991 | Sasai et al. .................... 365/49 |
| 5,054,034 A | 10/1991 | Hughes-Hartogs ............. 375/8 |
| 5,059,925 A | 10/1991 | Weisbloom ................. 331/1 A |
| 5,063,612 A | 11/1991 | McKeown |
| 5,072,449 A | 12/1991 | Enns et al. ................. 371/37.1 |
| 5,088,032 A | 2/1992 | Bosack ....................... 395/200 |
| 5,095,480 A | 3/1992 | Fenner |
| RE33,900 E | 4/1992 | Howson ...................... 370/105 |
| 5,115,431 A | 5/1992 | Williams et al. ........... 370/94.1 |
| 5,128,945 A | 7/1992 | Enns et al. ................. 371/37.1 |
| 5,136,580 A | 8/1992 | Videlock et al. .............. 370/60 |
| 5,166,930 A | 11/1992 | Braff et al. ................. 370/94.1 |
| 5,199,049 A | 3/1993 | Wilson ........................ 375/104 |
| 5,206,886 A | 4/1993 | Bingham ...................... 375/97 |
| 5,208,811 A | 5/1993 | Kashio et al. |
| 5,212,686 A | 5/1993 | Joy et al. ....................... 370/60 |
| 5,224,099 A | 6/1993 | Corbalis et al. ........... 370/94.2 |
| 5,226,120 A | 7/1993 | Brown et al. ............... 395/200 |
| 5,228,062 A | 7/1993 | Bingham ...................... 375/97 |
| 5,229,994 A | 7/1993 | Balzano et al. .......... 370/85.13 |
| 5,233,604 A | 8/1993 | Ahmadi et al. |
| 5,237,564 A | 8/1993 | Lespagnol et al. ......... 370/60.1 |
| 5,241,682 A | 8/1993 | Bryant et al. ............... 395/800 |
| 5,243,342 A | 9/1993 | Kattemalalavadi et al. . 341/106 |
| 5,243,596 A | 9/1993 | Port et al. .................... 370/94.1 |
| 5,247,516 A | 9/1993 | Bernstein et al. ............. 370/82 |
| 5,249,178 A | 9/1993 | Kurano et al. ................. 370/60 |
| 5,249,292 A | 9/1993 | Chiappa |
| 5,253,251 A | 10/1993 | Aramaki |
| 5,255,291 A | 10/1993 | Holden et al. ............... 375/111 |
| 5,260,933 A | 11/1993 | Rouse ........................... 370/14 |
| 5,260,978 A | 11/1993 | Fleischer et al. ............ 375/106 |
| 5,267,235 A | 11/1993 | Thacker |
| 5,268,592 A | 12/1993 | Bellamy et al. .............. 307/43 |
| 5,268,900 A | 12/1993 | Hluchyj et al. ............ 370/94.1 |
| 5,271,004 A | 12/1993 | Proctor et al. ................ 370/60 |
| 5,274,631 A | 12/1993 | Bhardwaj ...................... 370/60 |
| 5,274,635 A | 12/1993 | Rahman et al. ............ 370/60.1 |
| 5,274,643 A | 12/1993 | Fisk ........................... 370/94.1 |
| 5,280,470 A | 1/1994 | Buhrke et al. ................ 370/13 |
| 5,280,480 A | 1/1994 | Pitt et al. .................. 370/85.13 |
| 5,280,500 A | 1/1994 | Mazzola et al. ............... 375/17 |
| 5,283,783 A | 2/1994 | Nguyen et al. |
| 5,287,103 A | 2/1994 | Kasprzyk et al. ....... 340/825.52 |
| 5,287,453 A | 2/1994 | Roberts |
| 5,291,482 A | 3/1994 | McHarg et al. ............... 370/60 |
| 5,305,311 A | 4/1994 | Lyles ............................. 370/60 |
| 5,307,343 A | 4/1994 | Bostica et al. ................ 370/60 |
| 5,309,437 A | 5/1994 | Perlman et al. .......... 730/85.13 |
| 5,311,509 A | 5/1994 | Heddes et al. ................ 370/60 |
| 5,313,454 A | 5/1994 | Bustini et al. ................ 370/13 |
| 5,313,582 A | 5/1994 | Hendel et al. .............. 395/250 |
| 5,317,562 A | 5/1994 | Nardin et al. ................. 370/16 |
| 5,319,644 A | 6/1994 | Liang ........................ 370/85.5 |
| 5,327,421 A | 7/1994 | Hiller et al. ................ 370/60.1 |
| 5,331,637 A | 7/1994 | Francis et al. ................ 370/54 |
| 5,345,445 A | 9/1994 | Hiller et al. ................ 370/60.1 |
| 5,345,446 A | 9/1994 | Hiller et al. ................ 370/60.1 |
| 5,353,283 A * | 10/1994 | Tsuchiya .................... 370/392 |
| 5,359,592 A | 10/1994 | Corbalis et al. ............... 370/17 |
| 5,361,250 A | 11/1994 | Nguyen et al. ............. 370/16.1 |
| 5,361,256 A | 11/1994 | Doeringer et al. ............ 370/60 |
| 5,361,259 A | 11/1994 | Hunt et al. .................... 370/84 |
| 5,365,524 A | 11/1994 | Hiller et al. ................ 370/94.2 |
| 5,367,517 A | 11/1994 | Cidon et al. .................. 370/54 |
| 5,371,852 A | 12/1994 | Attanasio et al. ........... 395/200 |
| 5,386,413 A | 1/1995 | McAuley et al. |
| 5,386,567 A | 1/1995 | Lien et al. ................... 395/700 |
| 5,390,170 A | 2/1995 | Sawant et al. ............. 370/58.1 |
| 5,390,175 A | 2/1995 | Hiller et al. ................... 370/60 |
| 5,394,394 A | 2/1995 | Crowther et al. ............. 370/60 |
| 5,394,402 A | 2/1995 | Ross .......................... 370/94.1 |
| 5,396,491 A | 3/1995 | Newman |
| 5,400,325 A | 3/1995 | Chatwani et al. .......... 370/60.1 |
| 5,408,469 A | 4/1995 | Opher et al. ............... 370/60.1 |
| 5,416,842 A | 5/1995 | Aziz ............................. 380/30 |
| 5,422,880 A | 6/1995 | Heitkamp et al. ............. 370/60 |
| 5,422,882 A | 6/1995 | Hiller et al. ................ 370/60.1 |
| 5,423,002 A | 6/1995 | Hart ............................ 395/200 |
| 5,426,636 A | 6/1995 | Hiller et al. ................ 370/60.1 |
| 5,428,607 A | 6/1995 | Hiller et al. ................ 370/60.1 |
| 5,430,715 A | 7/1995 | Corbalis et al. ............... 370/54 |
| 5,430,729 A | 7/1995 | Rahnema |
| 5,442,457 A | 8/1995 | Najafi ......................... 358/400 |
| 5,442,630 A | 8/1995 | Gagliardi et al. ......... 370/85.13 |
| 5,452,297 A | 9/1995 | Hiller et al. ................ 370/60.1 |
| 5,473,599 A | 12/1995 | Li et al. ........................ 370/16 |
| 5,473,607 A | 12/1995 | Hausman et al. ......... 370/85.13 |
| 5,477,541 A * | 12/1995 | White et al. ................ 370/392 |
| 5,485,455 A * | 1/1996 | Dobbins ..................... 370/392 |
| 5,490,140 A | 2/1996 | Abensour et al. |
| 5,490,258 A | 2/1996 | Fenner |
| 5,491,687 A | 2/1996 | Christensen et al. .......... 370/17 |
| 5,491,804 A | 2/1996 | Heath et al. ................. 395/275 |
| 5,497,368 A | 3/1996 | Reijnierse et al. |
| 5,504,747 A | 4/1996 | Sweasey |
| 5,509,006 A | 4/1996 | Wilford et al. ................ 370/60 |
| 5,517,494 A | 5/1996 | Green |
| 5,519,704 A | 5/1996 | Farinacci et al. ......... 370/85.13 |
| 5,519,858 A | 5/1996 | Walton et al. .............. 395/600 |
| 5,526,489 A | 6/1996 | Nilakantan et al. .... 395/200.02 |
| 5,530,963 A | 6/1996 | Moore et al. .......... 395/200.15 |
| 5,535,195 A | 7/1996 | Lee .............................. 370/54 |

| | | |
|---|---|---|
| 5,539,734 A | 7/1996 | Burwell et al. |
| 5,541,911 A | 7/1996 | Nilakantan et al. |
| 5,546,370 A | 8/1996 | Ishikawa |
| 5,555,244 A | 9/1996 | Gupta et al. |
| 5,561,669 A | 10/1996 | Lenney et al. ............ 370/60.1 |
| 5,566,170 A | 10/1996 | Bakke ..................... 370/60 |
| 5,583,862 A | 12/1996 | Callon ..................... 370/397 |
| 5,592,470 A | 1/1997 | Rudrapatna et al. ........ 370/320 |
| 5,598,581 A | 1/1997 | Daines et al. ............... 395/872 |
| 5,600,798 A | 2/1997 | Cherukuri et al. |
| 5,602,770 A * | 2/1997 | Ohira ..................... 365/49 |
| 5,604,868 A | 2/1997 | Komine et al. |
| 5,608,726 A | 3/1997 | Virgile |
| 5,617,417 A | 4/1997 | Sathe et al. ............... 370/394 |
| 5,617,421 A | 4/1997 | Chin et al. ................ 370/402 |
| 5,630,125 A | 5/1997 | Zellweger |
| 5,631,908 A | 5/1997 | Saxe |
| 5,632,021 A | 5/1997 | Jennings et al. ............ 395/309 |
| 5,633,869 A | 5/1997 | Burnett et al. |
| 5,634,010 A | 5/1997 | Ciscon et al. |
| 5,638,359 A | 6/1997 | Peltola et al. |
| 5,644,718 A | 7/1997 | Belove et al. |
| 5,659,684 A | 8/1997 | Giovannoni et al. |
| 5,666,353 A | 9/1997 | Klausmeier et al. |
| 5,673,265 A | 9/1997 | Gupta et al. |
| 5,675,579 A | 10/1997 | Watson et al. |
| 5,678,006 A | 10/1997 | Valizadeh et al. |
| 5,680,116 A | 10/1997 | Hashimoto et al. |
| 5,684,797 A | 11/1997 | Aznar et al. ............... 370/390 |
| 5,684,954 A | 11/1997 | Kaiserwerth ............ 395/200.2 |
| 5,687,324 A | 11/1997 | Green et al. |
| 5,689,506 A | 11/1997 | Chiussi et al. ............. 370/388 |
| 5,694,390 A | 12/1997 | Yamato et al. |
| 5,724,351 A | 3/1998 | Chao et al. |
| 5,740,097 A * | 4/1998 | Satoh ....................... 365/49 |
| 5,748,186 A | 5/1998 | Raman |
| 5,748,617 A | 5/1998 | McLain, Jr. |
| 5,754,547 A | 5/1998 | Nakazawa |
| 5,781,772 A | 7/1998 | Wilkinson, III et al. |
| 5,802,054 A | 9/1998 | Bellenger |
| 5,802,065 A | 9/1998 | Ogawa ..................... 370/469 |
| 5,835,710 A * | 11/1998 | Nagami et al. ............ 709/250 |
| 5,841,874 A * | 11/1998 | Kempke et al. ............ 380/50 |
| 5,854,903 A | 12/1998 | Morrison et al. |
| 5,856,981 A | 1/1999 | Voelker |
| 5,872,783 A * | 2/1999 | Chin ..................... 370/392 |
| 5,892,924 A * | 4/1999 | Lyon ..................... 370/405 |
| 5,898,686 A | 4/1999 | Virgile |
| 5,903,559 A | 5/1999 | Acharya et al. |
| 5,909,440 A * | 6/1999 | Ferguson ................ 370/389 |
| 5,909,686 A * | 6/1999 | Muller et al. ............. 370/401 |
| 5,914,953 A | 6/1999 | Krause et al. |
| 5,917,820 A * | 6/1999 | Rekhter .................. 370/392 |
| 5,920,566 A | 7/1999 | Hendel .................... 370/401 |
| 5,938,736 A * | 8/1999 | Muller .................... 370/392 |
| 5,949,786 A * | 9/1999 | Bellenger ................. 370/401 |
| 5,996,021 A * | 11/1999 | Civanlar .................. 370/392 |
| 6,011,795 A | 1/2000 | Varghese et al. |
| 6,014,659 A | 1/2000 | Wilkinson, III et al. |
| 6,018,524 A | 1/2000 | Turner et al. |
| 6,034,958 A * | 3/2000 | Wicklund ................ 370/395 |

| | | |
|---|---|---|
| 6,052,683 A | 4/2000 | Irwin |
| 6,061,712 A | 5/2000 | Tzeng |
| 6,078,590 A | 6/2000 | Farinacci et al. |
| 6,081,522 A * | 6/2000 | Hendel .................... 370/389 |
| 6,088,356 A * | 7/2000 | Hendel .................... 370/389 |
| 6,122,279 A * | 9/2000 | Milway ................... 370/395 |
| 6,157,641 A * | 10/2000 | Wilford .................. 370/389 |
| 6,212,183 B1 * | 4/2001 | Wilford .................. 370/392 |

FOREIGN PATENT DOCUMENTS

| | | | |
|---|---|---|---|
| EP | 0 431 751 A1 | 11/1990 | .......... H04L/12/46 |
| EP | 0 431 751 A1 | 6/1991 | |
| EP | 0 567 217 A2 | 10/1993 | .......... H04L/12/46 |
| WO | WO 93/07569 | 4/1993 | .......... G06F/13/40 |
| WO | WO 93/07692 | 4/1993 | ............ H04J/3/24 |
| WO | WO 94/01828 | 1/1994 | .......... G06F/13/40 |
| WO | WO 95/20850 | 8/1995 | .......... H04L/12/56 |

OTHER PUBLICATIONS

Becker, D., "3c589.c: A 3c589 EtherLink3 ethernet driver for linux." becker@CESDIS.gsfc.nasa.gov, May 3, 1994, pp. 1–13.

Chowdhury, et al., "Alternative Bandwidth Allocation Algorithms for Packet Video in ATM Networks," INFOCOM 1992, pp. 1061–1068.

Doeringer, W., "Routing on Longest–Matching Prefixes," IEEE/ACM Transactions in Networking, vol. 4, No. 1, Feb. 1996, pp. 86–97.

Esaki, et al., "Datagram Delivery in an ATM–Internet," 2334b IEICE Transactions on Communications, Mar. 1994, No. 3, Tokyo, Japan.

IBM Corporation, "Method and Apparatus for the Statistical Multiplexing of Voice, Data and Image Signals," IBM Technical Disclosure Bulletin, No. 6, Nov. 1992, pp. 409–411.

Pei, et al., "Putting Routing Tables in Silicon," IEEE Network Magazine, Jan. 1992, pp. 42–50.

Perkins, D., "Requirements for an Internet Standard Point––to–Point Protocol," Network Working Group, RFC 1547, Dec. 1993, pp. 1–19.

Simpson, W., "The Point–to–Point Protocol (PPP)," Network Working Group, RFC 1548, Dec. 1993, pp. 1–53.

Tsuchiya, P.F., "A Search Algorithm for Table Entries with Non–contiguous Wildcarding," Abstract, Bellcore.

Zhang, et al., "Rate–Controlled Static–Priority Queueing," INFOCOM 1993, pp. 227–236.

Girish P. Chandranmenon and George Varghese, Member IEEE. "Trading Packet Headers for Packet Processing". 1996 IEEE/ACM Transactions on Networking, vol. 4, No. 2, Apr. 1996.

"Pluris Massively Parallel Routing". (White Paper).

William Stallings, Data and Computer Communications, pp. 329–333, Prentice Hall, Upper Saddle River, New Jersey 07458.

* cited by examiner

ENHANCED INTERNET PACKET ROUTING LOOKUP

This application is submitted in the name of the following inventor:

| Inventor | Citizenship | Residence Address |
|---|---|---|
| Wilford, Bruce A. | United Kingdom | 935 Eastwood Place Los Altos, California 94024 |

The assignee is Cisco Technology, Inc., a California corporation having an office at 170 West Tasman Drive, San Jose CA 95134.

Title of Invention

Enhanced Internet Packet Routing Lookup

BACKGROUND OF THE INVENTION

1. Field of the Invention

The invention relates to packet switching.

2. Related Art

In a packet-switched network, a "router" is a device which receives packets on one or more input interfaces and which outputs those packets on one of a plurality of output interfaces, so as to move those packets within the network from a source device to a destination device. Each packet includes header information which indicates the destination device (and other information), and the router includes routing information which associates an output interface with information about the destination device (possibly with other information). The router can also perform other operations on packets, such as rewriting the packets according to their routing protocol or to reencapsulate the packets from a first routing protocol to a second routing protocol. It is advantageous for routers to operate as quickly as possible, so that as many packets as possible can be switched in a unit time.

One problem which has arisen in the art is that routing lookup, that is, determining an output interface on which to output the packet in response to the header information from the packet, can take substantial processing time, and that the demand on the router from that processing time continues to grow with increased network demand and increased network size. This problem has been exacerbated by addition of more complexity in routing protocols and routing techniques, such as the use of access control lists, network flow switching, quality of service requirements, and of attempts to determine the nature or routing treatment of packets in response to their source.

Some known routers, such as those described in U.S. application Ser. No. 08/655,429, "Network Flow Switching and Flow Data Export", filed May 28, 1996, in the name of inventors Darren Kerr and Barry Bruins, and assigned to Cisco Systems, Inc., attorney docket number CIS-016, now U.S. Pat. No. 6,243,667 and U.S. application Ser. No. 08/771,438, having the same title, filed Dec. 19, 1996, in the name of the same inventors, assigned to the same assignee, attorney docket number CIS-017, now U.S. Pat. No. 6,308,148 determine routing lookup in response to a network "flow" associated with the packet, rather than just in response to the destination address for the packet. This technique, called network flow switching, allows the router to determine routing procedure a single time for the entire flow, and to route all packets for the flow in the same manner.

While such routers are able to reduce the number of routing lookup operations required for a sequence of packets in a flow, they do not take advantage of all information available for rapid routing. For a first example, for some packets the amount of packet header information for determining an output interface can be relatively longer or shorter (as in IP protocols, where entire sets of destination addresses can sometimes be assigned to a single output interface). For a second example, for some packets (as in multicast protocols, due to the nature of the multicast tree) the choice of output interface can be responsive to the input interface from which the packet was received.

Accordingly, it would be desirable to provide a method and system for performing routing lookup, which is responsive both to the header information associated with a packet and to the length of that header information, and which is makes use of all useful information including an input interface from which the packet was received. These advantages are achieved in an embodiment of the invention in which both the destination address and the length of that destination address are matched using a lookup table having separate entries for selected addresses and their lengths, which can be accessed in parallel for multiple representations of destination addresses, and in which the input interface associated with the packet is included in the information used for matching.

SUMMARY OF THE INVENTION

The invention provides a method and system for routing information lookup for packets using routing protocols such as IP or IP multicast (IGMP), or MPLS (multiprotocol label switching, also known as tag switching or label switching) or MPLS multicast, in which both the destination address and the length of that destination address are matched using a lookup table having separate entries for selected addresses and their lengths, which can be accessed in parallel for multiple representations of destination addresses, and in which the input interface associated with the packet is included in the information used for matching.

DETAILED DESCRIPTION OF THE PREFERRED EMBODIMENT

In the following description, a preferred embodiment of the invention is described with regard to preferred process steps and data structures. Those skilled in the art would recognize after perusal of this application that embodiments of the invention can be implemented using general purpose processors or special purpose processors or other circuits adapted to particular process steps and data structures described herein, and that implementation of the process steps and data structures described herein would not require undue experimentation or further invention.

Inventions described herein can be used in conjunction with inventions described in the following applications:

application Ser. No. 08/918,505, filed the same day, Express Mail Mailing No. EM337222825US, in the name of the same inventor, titled "Multiprotocol Packet Recognition and Switching", attorney docket number CIS-020A, now U.S. Pat. No. 6,157,641; and application Ser. No. 08/917,654, filed the same day, Express Mail Mailing No. EM166118235US, in the name of the same inventor, titled "Multiple Parallel Packet Routing Lookup", attorney docket number CIS-020B, now U.S. Pat. No. 6,212,183.

Each of these applications is hereby incorporated by reference as if fully set forth herein.

System For Enhanced Internet Packet Routing Lookup

A system for enhanced internet packet routing lookup includes a multiprotocol packet recognizer as further described in application Ser. No. 08/918,505, titled "Multiprotocol Packet Recognition and Switching", attorney docket number CIS-020A, now U.S. Pat. No. 6,308,148 and in application Ser. No. 08/917,654, titled "Multiple Parallel Packet Routing Lookup", attorney docket number CIS-020B, now U.S. Pat. No. 6,212,183 each of which is hereby incorporated by reference as if fully set forth herein. As more fully described in these incorporated applications, each packet is input to a packet buffer, coupled to a set of encapsulation recognizers and an encapsulation multiplexer, and coupled to a set of longest-match recognizers and a set of longest-match multiplexers, so as to first recognize the type of packet encapsulation and to second recognize relevant packet header information for routing the packet.

Figure 1:
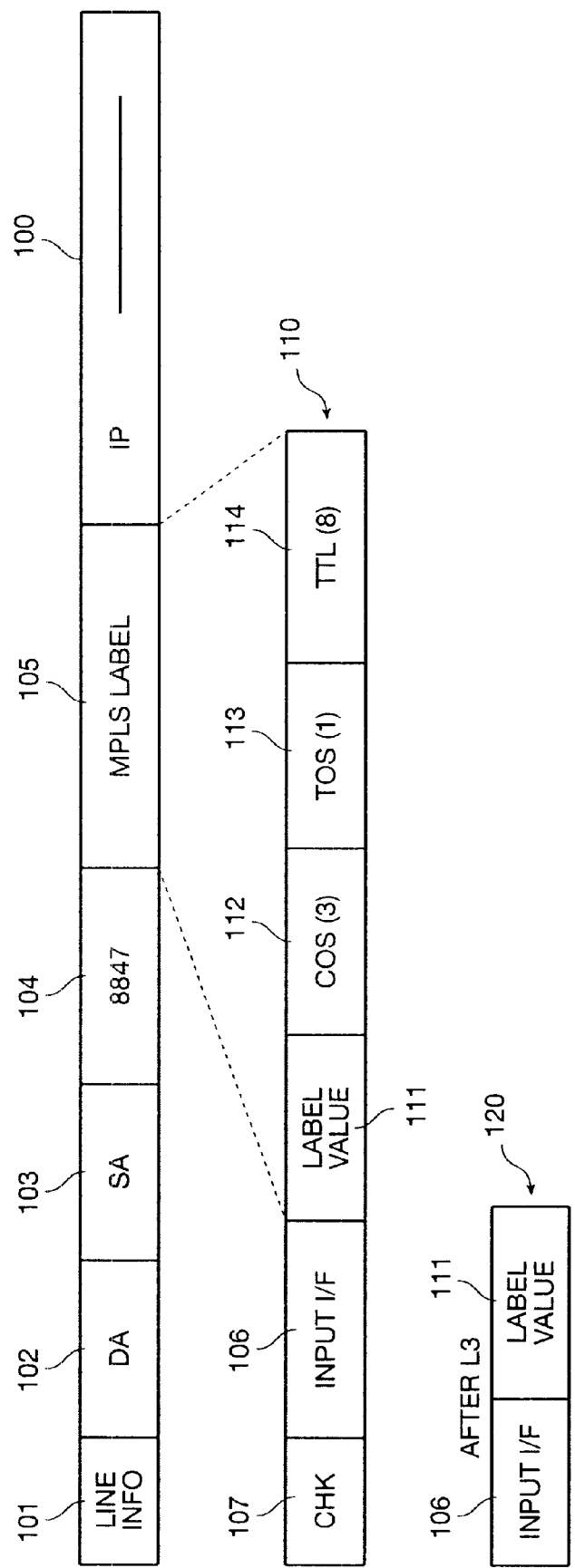
FIG. 1 shows information for an example packet using an MPLS protocol.

FIG. 1 shows information for an example packet using an MPLS protocol.

As used herein, "MPLS" refers to multiprotocol label switching, also known as "tag switching" or "label switching", as defined in RFC 2105, "Cisco Systems' Tag Switching Architecture Overview", by Y. Rekhter, D. Katz, E. Rosen, and G. Swallow (February 1997), which document describes label formats and packet formats, and is hereby incorporated by reference as if fully set forth herein.

1. MPLS Packet Header

The information for the example packet includes an example packet header 100. In the case where the packet is encapsulated using an MPLS protocol, the packet header 100 includes a set of line information 101, a destination address (DA) 102, a source address (SA) 103, a fixed code 104 indicating that the packet is encapsulated using MPLS, and an MPLS label 105, followed by a sequence of words in continuation of the packet.

In a preferred embodiment, the line information 101 includes information about how the packet was received, including an input interface identifier 106 for an input interface associated with the packet.

In a preferred embodiment, the fixed code 104 indicating that the packet is encapsulated using MPLS comprises the value hexadecimal 88 47 (for MPLS unicast) or the value hexadecimal 88 48 (for MPLS multicast).

The MPLS label 105 includes information as specified by the MPLS protocol.

In a preferred embodiment, additional information is included with the packet header 100 when the packet header 100 is coupled to the longest-match recognizers, including a checksum value (CHK) 107 associated with the packet header 100 and computed by a checksum element.

Computation of the checksum value CHK 107 is further described in application Ser. No. 08/918,505, titled "Multiprotocol Packet Recognition and Switching", attorney docket number CIS-020A, now U.S. Pat. No. 6,576,641 and in application Ser. No. 08/917,654, titled "Multiple Parallel Packet Routing Lookup", attorney docket number CIS-020B, now U.S. Pat. No. 6,212,183 each of which is hereby incorporated by reference as if fully set forth herein. As more fully described in these incorporated applications, the checksum value CHK 107 includes one bit for each type of packet header protocol recognized by the encapsulation recognizers. In a preferred embodiment, this includes one bit for a correct IP checksum and correct packet header length, one bit for a correct CLNS checksum and correct packet header length, and one bit for just a correct packet header length. Since the MPLS protocol does not specify a checksum value, the latter bit is checked only for indicating correct packet header length.

2. Packet Header Information

The information for the example packet includes a set of packet header information 110 gleaned by operation of the encapsulation recognizers and encapsulation multiplexer in response to the example packet header 100.

In a preferred embodiment, the packet header information 110 includes the checksum value CHK 107, the input interface identifier 106, a 20-bit label value 111, a three-bit class of service (COS) value 112, a one-bit top of stack (TOS) value 113, and a eight-bit time-to-live (TTL) value 114.

As described herein, the input interface identifier 106 comprises a value which identifies the input interface associated with the packet (that is, on which the packet was received).

As described herein, the checksum value CHK 107 is computed by the checksum element and simply confirms that a length of the packet header 100 in bytes is the same as specified in the packet header 100 itself.

As specified by the MPLS protocol, the 20-bit label value 111 includes information for routing the packet to an output interface.

As also specified by the MPLS protocol, other values comprising in the packet header information 110, including the class of service value COS 112, the type of service value TOS 113, and the time-to-live value TTL 114, are relevant to treatment of the packet but in a preferred embodiment do not effect the choice of output interface to which to route the packet. However, in alternative embodiments, the other values may be used to distinguish between different output interfaces which are coupled to differing routes to the destination. For example, the class of service value COS 112 might be used to distinguish between a relatively high-priority traffic route and a relatively low-priority traffic route.

3. MPLS Routing Information

The information for the example packet includes a set of example routing information 120 gleaned by operation of the longest-match recognizers and longest-match multiplexers in response to the example packet header information 110.

The routing information 120 includes the input interface identifier 106 and the label value 111. For packets which use an MPLS multicast protocol, the input interface identifier 106 is needed for routing the packet; for packets which use an MPLS unicast protocol, the input interface identifier 106 is generally not needed for routing the packet.

Method of Operation

Figure 2:
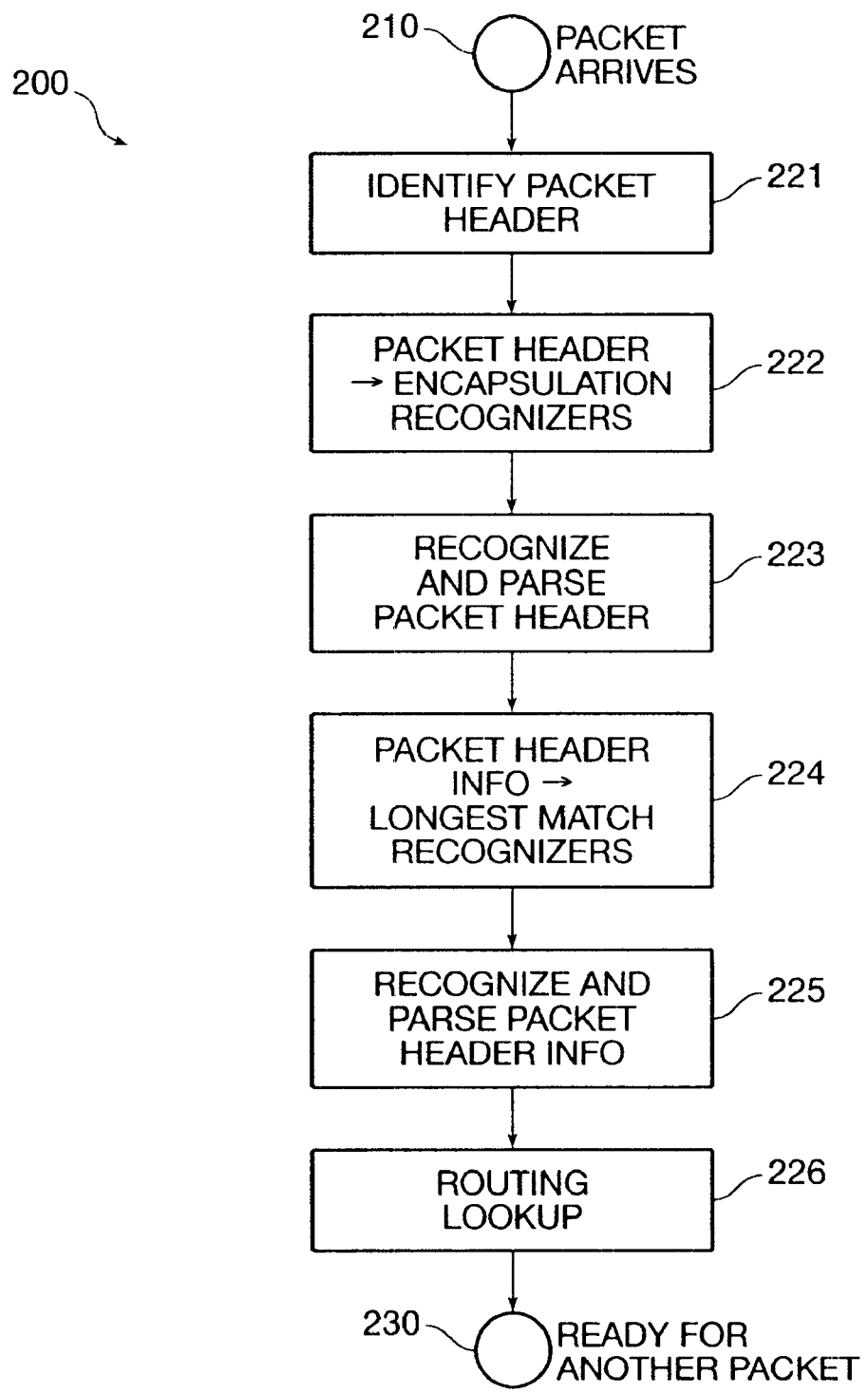
FIG. 2 shows a process flow diagram of a method of operating the system.

FIG. 2 shows a process flow diagram of a method of operating the system.

A method 200 of operating the system is controlled by elements described in the application Ser. No. 08/918,505, titled "Multiprotocol Packet Recognition and Switching", attorney docket number CIS-020A, now U.S. Pat. No. 6,157,641 and in application Ser. No. 08/917,654, titled "Multiple Parallel Packet Routing Lookup", attorney docket number CIS -020B, now U.S. Pat. No. 6,212,183 each of which is hereby incorporated by reference as if fully set forth herein. The operation of those elements is fully described therein. The method 200 includes flow points and process steps as described herein.

At a flow point 210, a packet using an MPLS protocol has arrived at an input interface, and is ready for processing.

At a step 221, a packet header 100 for the packet is identified and coupled to the packet buffer.

At a step 222, the packet header 100 is coupled from the packet buffer to the encapsulation recognizers. In the case where the packet is encapsulated using an MPLS protocol, the packet header 100 includes the packet header information 110 described herein with reference to FIG. 1. In the case where the packet is encapsulated using an MPLS protocol, the packet header 100 is recognized by at least one encapsulation recognizer configured to recognize those packets which are so encapsulated.

At a step 223, the at least one encapsulation recognizer configured to recognize packets using the MPLS protocol, along with the encapsulation multiplexer, collectively recognize and parse the packet header 100, so as to produce the packet header information 110.

At a step 224, the packet header information 110 is coupled from the encapsulation multiplexer to the longest-match recognizers. In the case where the packet is encapsulated using an MPLS protocol, the packet header information 110 includes the routing information 120 described herein with reference to FIG. 1. In the case where the packet is encapsulated using an MPLS switching protocol, the packet header information 110 is recognized by at least one longest-match recognizer configured to recognize MPLS protocol information.

At a step 225, the at least one longest-match recognizer configured to recognize the MPLS protocol information, along with at least one longest-match multiplexer, collectively recognize and parse the packet header information 110, so as to produce the routing information 120.

At a step 226, the routing information 120 is used for routing lookup for the packet. The routing lookup is responsive to the routing information 120, and is thus responsive to both the input interface identifier 106 and to the label value 111. In one embodiment, the routing lookup involves generating a hash key from the routing information and using the hash key to index to routing lookup tables.

At a flow point 230, routing of the packet has been accomplished, and the system is ready to route another packet.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A method including:

receiving a packet header and an input interface identifier;

coupling said packet header to plural encapsulation recognizers configured to produce header information from said packet header, said plural encapsulation recognizers recognizing packet headers for multiple protocols, said header information including said input interface identifier;

coupling said header information to plural longest match recognizers so as to produce routing information, said plural longest match recognizers operating in parallel, said routing information determined responsive to a longest match recognized for said header information including said input interface identifier; and using said routing information to index to one or more routing lookup tables having treatment information regarding treatment of packets, said treatment information being responsive to said routing information and therefore to said input interface identifier.

2. A method as in claim 1, wherein said one or more routing lookup tables include a plurality of entries corresponding to said packet header and differing with regard to said input interface identifier.

3. A method as in claim 2, wherein said one or more routing lookup tables include a plurality of entries corresponding to said packet header and responsive to a multicast packet.

4. A method as in claim 3, wherein said multicast packet is encapsulated using an multiprotocol lable switching protocol.

5. An apparatus for use in packet routing, comprising:

an input interface that receives a packet header, said input interface having an input interface identifier;

plural encapsulation recognizers configured to produce header information from said packet header, said plural encapsulation recognizers recognizing packet headers for multiple protocols, said header information including said input interface identifier;

plural longest match recognizers that produce routing information from said header information, said plural longest match recognizers operating in parallel, said routing information determined responsive to a longest match recognized for said header information including said input interface identifier; and one or more routing lookup tables having treatment information regarding treatment of packets, said treatment information being responsive to said routing information and therefore to said input interface identifier.

6. An apparatus as in claim 5, wherein said one or more routing lookup tables include a plurality of entries corresponding to said packet header and differing with regard to said input interface identifier.

7. An apparatus as in claim 6, wherein said one or more routing lookup tables include a plurality of entries corresponding to said packet header and responsive to a multicast packet.

8. An apparatus as in claim 7, wherein said multicast packet is encapsulated using an multiprotocol lable switching protocol.

9. A memory storing information including instructions, the instructions executable by a processor, the instructions comprising:

code to receive a packet header and an input interface identifier;

code to couple said packet header to plural encapsulation recognizers configured to produce header information from said packet header, said plural encapsulation recognizers recognizing packet headers for multiple protocols, said header information including said input interface identifier;

code to couple said header information to plural longest match recognizers so as to produce routing information, said plural longest match recognizers operating in parallel, said routing information determined responsive to a longest match recognized for said header information including said input interface identifier; and code to use said routing information to index to one or more routing lookup tables having treatment information regarding treatment of packets, said treatment information being responsive to said routing information and therefore to said input interface identifier.

10. A memory as in claim 9, wherein said one or more routing lookup tables include a plurality of entries corresponding to said packet header and differing with regard to said input interface identifier.

11. A memory as in claim 10, wherein said one or more routing lookup tables include a plurality of entries corresponding to said packet header and responsive to a multicast packet.

12. A memory as in claims 11, wherein said multicast packet is encapsulated using an multiprotocol lable switching protocol.

* * * * *